US007605873B2

(12) United States Patent
Tseng et al.

(10) Patent No.: US 7,605,873 B2

(45) Date of Patent: Oct. 20, 2009

(54) LCD TV CAPABLE OF BEING USED AS A MUSIC STATION ONLY

(75) Inventors: Shih-Hua Tseng, Taipei (TW); Che-Hsuan Liu, Taipei (TW)

(73) Assignee: Tatung Company, Taipei (TW)

( * ) Notice: Subject to any disclaimer, the term of this patent is extended or adjusted under 35 U.S.C. 154(b) by 850 days.

(21) Appl. No.: 11/362,789

(22) Filed: Feb. 28, 2006

(65) Prior Publication Data

US 2007/0153136 A1 Jul. 5, 2007

(30) Foreign Application Priority Data

Dec. 30, 2005 (TW) ............................ 94147593 A

(51) Int. Cl.
*H04N 3/27* (2006.01)
*H04N 5/46* (2006.01)
*H04N 5/268* (2006.01)
*H04N 5/63* (2006.01)
*H04N 3/14* (2006.01)

(52) U.S. Cl. ...................... 348/729; 348/730; 348/790; 348/705; 348/554

(58) Field of Classification Search ................. 348/730, 348/553–555, 552, 790, 734, 838, 839, 705, 348/706, 729
See application file for complete search history.

(56) References Cited

U.S. PATENT DOCUMENTS

| | | | | |
|---|---|---|---|---|
| 7,317,495 | B2 * | 1/2008 | Takahashi | 348/838 |
| 2005/0123135 | A1 * | 6/2005 | Hunt et al. | 380/200 |
| 2005/0219423 | A1 * | 10/2005 | Kamise et al. | 348/730 |
| 2005/0264702 | A1 * | 12/2005 | Yoshii | 348/687 |
| 2006/0114248 | A1 * | 6/2006 | Lee et al. | 345/204 |
| 2006/0285024 | A1 * | 12/2006 | Chou et al. | 348/790 |
| 2007/0254696 | A1 * | 11/2007 | Kajitani | 455/556.1 |

* cited by examiner

*Primary Examiner*—Victor R Kostak
(74) *Attorney, Agent, or Firm*—Bacon & Thomas, PLLC

(57) ABSTRACT

An LCD TV capable of being used as a music station only, which can turn off the internal video decoder and the internal backlight power when the LCD TV only desires to output an audio. The LCD TV panel has a backlight control terminal with a first state and a second state to turn on/off the internal backlight power based on the first or second state. A video decoder has a working mode and a standby mode. When an instruction received by a command input device is a panel backlight power turning-off instruction, a controller produces a control signal to set the backlight control terminal to the second state to thereby drive the LCD TV panel to turn off the backlight power thereon and set the video decoder to the standby mode.

17 Claims, 3 Drawing Sheets

LCD TV CAPABLE OF BEING USED AS A MUSIC STATION ONLY

BACKGROUND OF THE INVENTION

1. Field of the Invention

The invention relates to a liquid crystal display television (LCD TV) and, more particularly, to an LCD TV capable of being used as a music station only, which has a function of playing music alone.

2. Description of Related Art

As semiconductor processes have developed rapidly, more transistors can be integrated in the same area such that electronic devices have the enhanced functions and also the electronic devices can be made light, thin and small. Liquid crystal display televisions (LCD TVs) that generally represent the high-technology image have the miniaturization feature, as compared to typical CRT televisions. In addition, LCD TVs have a wide screen to provide a better visual enjoyment. Further, some LCD TVs also provide 5.1 audio channels or Dolby output. Thus, a user can use the internal audio device to listen to music with high tone quality.

However, when the user desires to listen to music through the internal audio device only, without viewing a TV program on screen, the video decoder and the panel backlight power are still activated, which wastes the power and reduces the lifetime of the LCD TV panel.

Therefore, it is desirable to provide an improved LCD TV to mitigate and/or obviate the aforementioned problems.

SUMMARY OF THE INVENTION

An object of the invention is to provide a liquid crystal display television (LCD TV) capable of being used as a music station only, which can turn off the backlight power on the panel thereof such that only the audio is output, thereby saving the power.

Another object of the invention is to provide a liquid crystal display television (LCD TV) capable of being used as a music station only, which can set the video decoder to a standby mode such that only the audio is output, thereby saving the power.

To achieve the object of the present invention, there is provided a liquid crystal display television (LCD TV) capable of being used as a music station only. The LCD TV can turn off a backlight power on a panel of the LCD TV when only an audio is to be played. The LCD TV includes a TV tuner, a video analog to digital converter (ADC), an audio decoder, an video decoder, an LCD TV panel, a controller and a command input device. The TV tuner receives and demodulates a TV signal to thus produce a first video transport stream and a first audio transport stream. The video/audio ADC receives and converts a video/audio signal to thus produce a second video transport stream and a second audio transport stream. The audio decoder is connected to the TV tuner and the video/audio ADC, and receives and selectively decodes the first and the second audio transport streams to thus produce a audio signal. The video decoder with an working mode and a standby mode is connected to the TV tuner and the video/audio ADC and, receives and selectively decodes the first and the second video transport streams to thus produce an video signal. The LCD TV panel receives the video signal for playing and has a backlight control terminal such that a backlight power on the LCD TV panel is turned on when the backlight control terminal is determined as a first state and turned off when the backlight control terminal is determined as a second state. The controller is connected to the audio decoder, the video decoder and the LCD TV panel for performing initialization and operating mode setting on the two decoders and the panel. The command input device is connected to the controller for receiving an instruction. When the instruction received is a video decoder and panel backlight power turning-off instruction, the controller produces a control signal to set the backlight control terminal to the second state to thereby drive the LCD TV panel to turn off the backlight power and set the video decoder to the standby mode.

Other objects, advantages, and novel features of the invention will become more apparent from the following detailed description when taken in conjunction with the accompanying drawings.

DETAILED DESCRIPTION OF THE PREFERRED EMBODIMENT

In the liquid crystal display television (LCD TV) capable of being used as a music station only, when the LCD TV only plays a sound, the backlight power on a panel of the LCD TV is turned off, and the internal video decoder is set to a standby mode, thereby saving the power.

Figure 1:
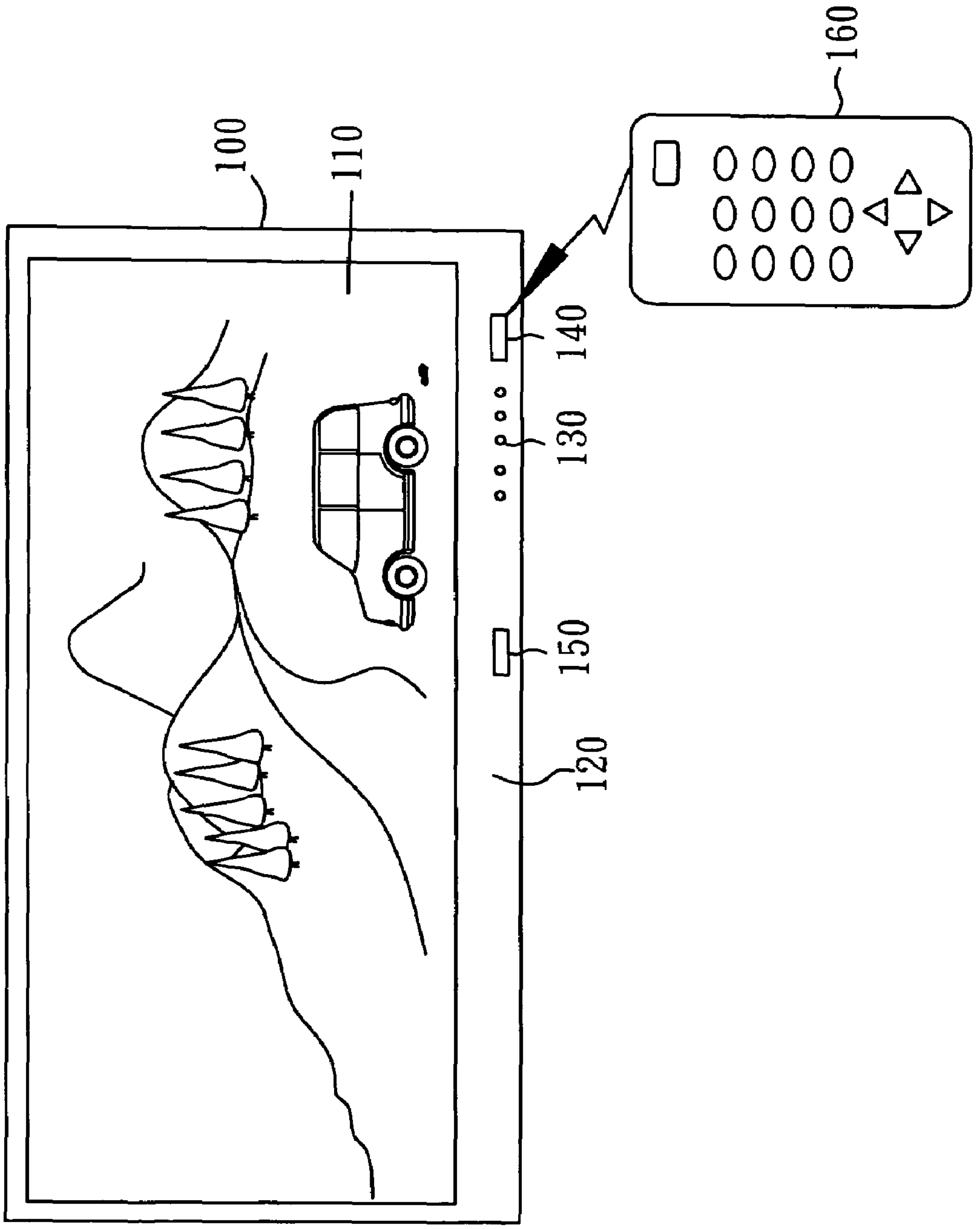
FIG. 1 is a schematic view of an LCD TV capable of being used as a music station only in accordance with the invention.

FIG. 1 is a schematic view of the LCD TV 100 capable of being used as a music station only in accordance with the invention. As shown in FIG. 1, the LCD TV includes an LCD TV panel 110 and an operating panel 120. The operating panel 120 is implemented with a plurality of keys 130, an infrared receiver 140 and a touch key 150. The keys 130 provide a user to perform associated settings, such as volume, brightness or channel settings, on the LCD TV 100. The infrared receiver 140 receives an instruction sent by an infrared remote control 160. The touch key 150 can produce a signal in response to a touch by the user for controlling the LCD TV 100.

Figure 2:
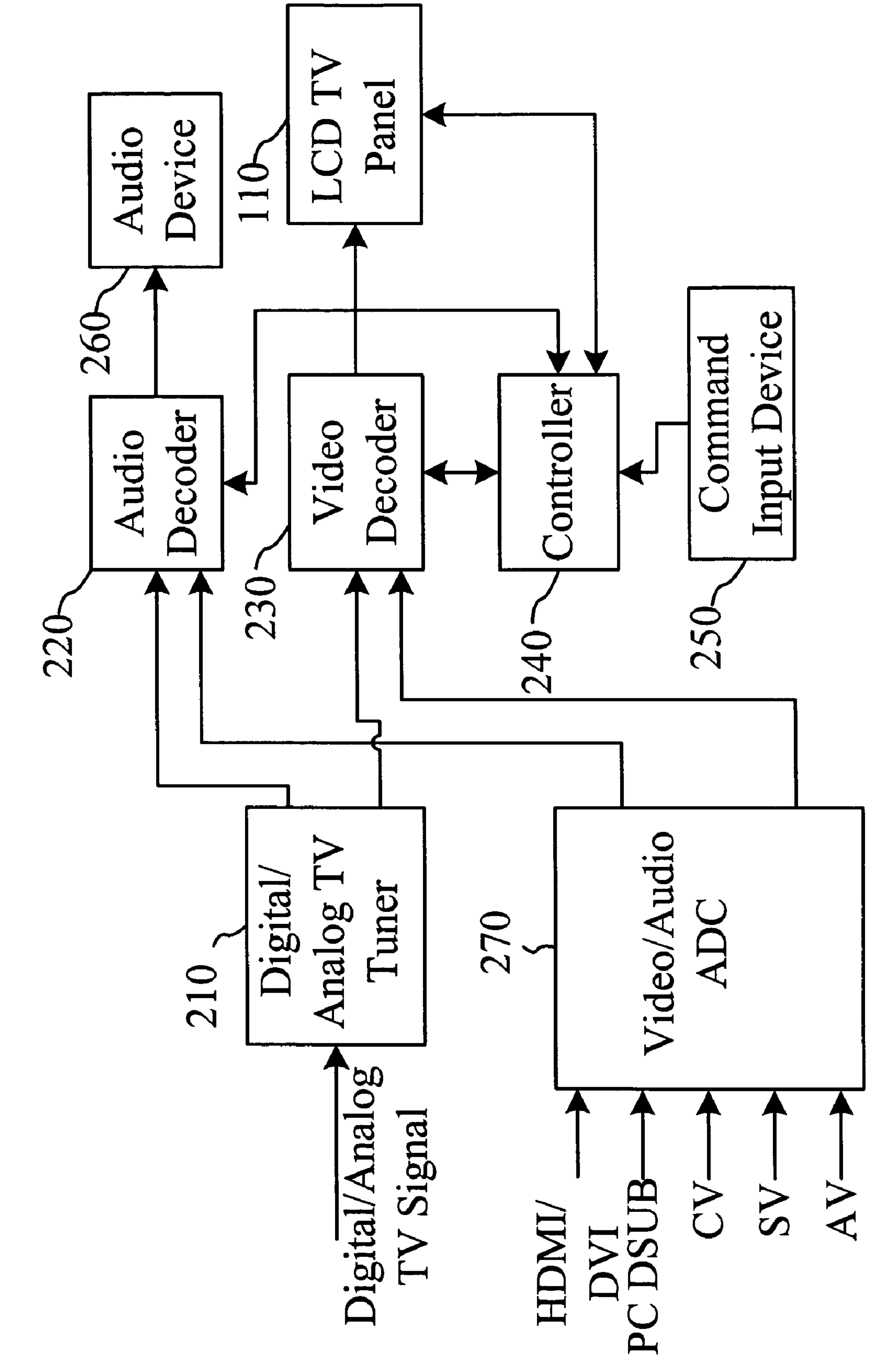
FIG. 2 is a block diagram of the internal circuit of FIG. 1 in accordance with the invention.

FIG. 2 is a block diagram of the internal circuit of FIG. 1 in accordance with the invention, where a backlight power (not shown) on the LCD TV panel 110 is turned off and an internal video decoder is set to a standby mode when the LCD TV only plays an audio signal. In FIG. 2, the LCD TV 100 includes a TV tuner 210, a video/audio analog to digital converter (ADC) 270, an audio decoder 220, a video decoder 230, the LCD TV panel 110, a controller 240, a command input device 250 and an audio device 260.

The TV tuner 210 can be a digital or analog TV tuner. The TV tuner 210 receives a TV signal and demodulates the TV signal to thus produce a first video transport stream and a first audio transport stream. The first video transport stream is coded to be an MPEG2, MPEG4 or H.264 transport stream.

The video/audio ADC 270 is a video/audio signal converter. The video/audio ADC 270 receives a video/audio signal, and converts the video/audio signal to thus produce a second video transport stream and a second audio transport stream.

The video signal received by the video/audio ADC 270 can be an HDMI, DVI, PC D-SUB, Composite Video (AV video), Y/C (S-Video), or Color Difference Video (CV), i.e., Component Video (YPbPr) transport stream.

The audio decoder 220 is connected to the TV tuner 210 and the video/audio ADC 270. The audio decoder 220 receives the first and the second audio transport streams and selectively decodes them to thus produce an audio signal. The audio device 260 can be a speaker to be connected to the audio decoder 220 for playing the audio signal.

The video decoder 230 is connected to the TV tuner 210 and the video/audio ADC 270. The video decoder 230 receives the first and the second video transport streams and selectively decodes them to thus produce a video signal. The video decode 230 decodes a received MPEG2, MPEG4 or H.264 transport stream to thus produce the video signal.

The controller 240 is connected to the audio decoder 220, the video decoder 230 and the LCD TV panel 110. The controller 240 performs initialization and working mode setting on the audio decoder 220, the video decoder 230 and the LCD TV panel 110.

Figure 3:
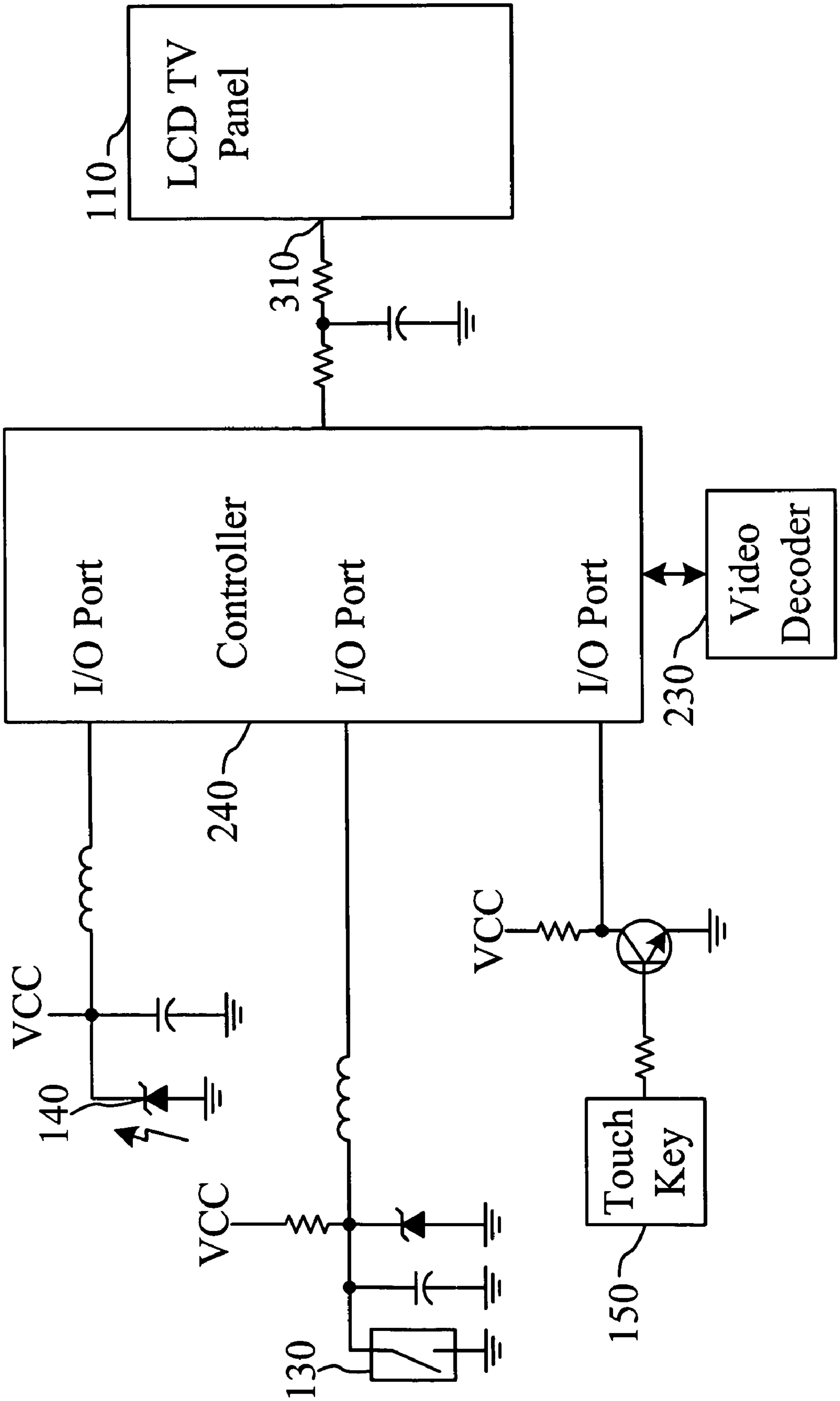
FIG. 3 is a schematic diagram of the circuit of a command input device and a controller in accordance with the invention.

FIG. 3 is a schematic diagram of the circuit of the command input device 250 and the controller 240 in accordance with the invention. The command input device 250 is connected to the controller 240 in order to receive an instruction. The command input device 250 can be one of the keys 130 or the touch key 150 implemented on the operating panel 120. The command input device 250 can also be the infrared receiver 140 implemented on the operating panel 120 to thereby receive an instruction sent by the infrared remote control 160. The infrared receiver 140 and the controller 240 are integrated into the same integrated circuit (IC).

The LCD TV panel 110 receives the video signal to play. The LCD TV panel 110 has a backlight control terminal 310. The backlight control terminal 310 has a first state and a second state. The LCD TV panel 110 can selectively turn on a backlight power (not shown) thereon in accordance with the first state or turn off the backlight power in accordance with the second state. The video decoder 230 has a working mode and a standby mode.

When a user desires to use the audio device of the LCD TV 100 to listen to music only, but not to view a TV program, the user requires pressing the infrared remote control 160, the touch key 150 or one of the keys 130 to produce a video decoder and panel backlight power turning-off instruction. When the turning-off instruction is received by the command input device 250, the controller 240 produces a control signal to set the backlight control terminal 310 to the second state to thereby drive the LCD TV panel 110 for turning off the backlight power thereon and set the video decoder 230 to the standby mode. Accordingly, the user can listen to music while the video decoder 230 and the panel backlight power of the LCD TV 100 are turned off, thereby saving the power.

When the user presses the infrared remote control 160, the touch key 150 or the key 130 again, an instruction rather than the video decoder and panel backlight power turning-off instruction is produced. When the instruction is received by the command input device 250, the controller 240 produces another control signal to set the backlight control terminal 310 to the first state to thereby drive the LCD TV panel 110 to turn on the backlight power thereon and set the video decoder 230 to the working mode. Since the LCD TV 100 turns off the panel backlight power and sets the video decoder to the standby mode only, an video corresponding to a TV signal can be displayed rapidly on the panel 110 through the video decoder 230 when the user wants to view the video and re-activates the panel backlight power of the LCD TV 100.

In view of the foregoing, the invention uses the video decoder 230 and the backlight control terminal 310 of the panel 110 to turn off the backlight power on the LCD TV panel 110 and set the video decoder 230 to the standby mode. Thus, the LCD TV 100 is used as a music state, and a user can accordingly listen to music only, thereby saving the power.

Although the present invention has been explained in relation to its preferred embodiment, it is to be understood that many other possible modifications and variations can be made without departing from the spirit and scope of the invention as hereinafter claimed.

What is claimed is:

1. A liquid crystal display television (LCD TV) capable of being used as a music station only, which turns off a backlight power when the LCD TV is used as the music station for playing an audio only, the LCD TV comprising:

- a TV tuner, which receives and demodulates a TV signal to thus produce a first video transport stream and a first audio transport stream;
- a video/audio analog to digital converter (ADC), which receives and demodulates a video/audio signal to thus produce a second video transport stream and a second audio transport stream;
- an audio decoder, which is connected to the TV tuner and the video/audio ADC and receives and selectively decodes the first and the second audio transport streams to thus produce an audio signal;
- a video decoder with a working mode and a standby mode, which is connected to the TV tuner and the video/audio ADC and receives and selectively decodes the first and the second video transport streams to thus produce an video signal;
- an LCD TV panel, which receives the video signal for playing and has a backlight control terminal having a first state and a second state such that the LCD TV panel turns on the backlight power thereon in accordance with the first state and turns off the backlight power in accordance with the second state;
- a controller, which is connected to the audio decoder, the video decoder and the LCD TV panel for performing initialization and working mode setting for the audio decoder, the video decoder and the panel; and
- a command input device, which is connected to the controller for receiving an instruction;
- wherein, when the instruction received is a video decoder and panel backlight power turning-off instruction, the controller produces a control signal to set the backlight control terminal to the second state to thereby drive the LCD TV panel to turn off the backlight power and set the video decoder to the standby mode.

2. The LCD TV as claimed in claim 1, further comprising an audio device, which is connected to the audio decoder for playing the audio signal.

3. The LCD TV as claimed in claim 1, wherein the TV tuner is a digital or analog TV tuner, and the video/audio ADC is a video/audio signal converter.

4. The LCD TV as claimed in claim 1, wherein the command input device is one or more keys implemented on an operating panel.

5. The LCD TV as claimed in claim 1, wherein the command input device is a touch key implemented on the operating panel.

6. The LCD TV as claimed in claim 1, wherein the command input device is an infrared receiver to receive an instruction sent by an infrared remote controller.

7. The LCD TV as claimed in claim 6, wherein the infrared receiver and the controller are integrated into a same integrated circuit (IC).

8. The LCD TV as claimed in claim 7, wherein the controller produces another control signal to set the backlight control terminal to the first state when the infrared receiver receives an instruction rather than the video decoder and panel backlight power turning-off instruction, to thereby drive the LCD TV panel to turn on the backlight power and set the video decoder to the working mode.

9. The LCD TV as claimed in claim 3, wherein the video/audio signal is an HDMI transmission stream.

10. The LCD TV as claimed in claim 3, wherein the video/audio signal is a DVI transmission stream.

11. The LCD TV as claimed in claim 3, wherein the video/audio signal is a PC D-SUB transmission stream.

12. The LCD TV as claimed in claim 3, wherein the video/audio signal is a Composite Video or AV Video transmission stream.

13. The LCD TV as claimed in claim 3, wherein the video/audio signal is a Y/C or S-Video transmission stream.

14. The LCD TV as claimed in claim 3, wherein the video/audio signal is a Color Difference Video (CV) or Component Video (YPbPr) transport stream.

15. The LCD TV as claimed in claim 3, wherein the first video transport stream and the first audio transport stream are coded to be an MPEG2 transport stream.

16. The LCD TV as claimed in claim 3, wherein the first video transport stream and the first audio transport stream are coded to be an MPEG4 transport stream.

17. The LCD TV as claimed in claim 3, wherein the transport coded to be an Advanced Video Coding transport stream in accordance with the AVC compression coding standard H.264.

* * * * *

UNITED STATES PATENT AND TRADEMARK OFFICE

CERTIFICATE OF CORRECTION

PATENT NO. : 7,605,873 B2
APPLICATION NO. : 11/362789
DATED : October 20, 2009
INVENTOR(S) : Tseng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Fifth Day of October, 2010

David J. Kappos
*Director of the United States Patent and Trademark Office*